Patented Jan. 9, 1934

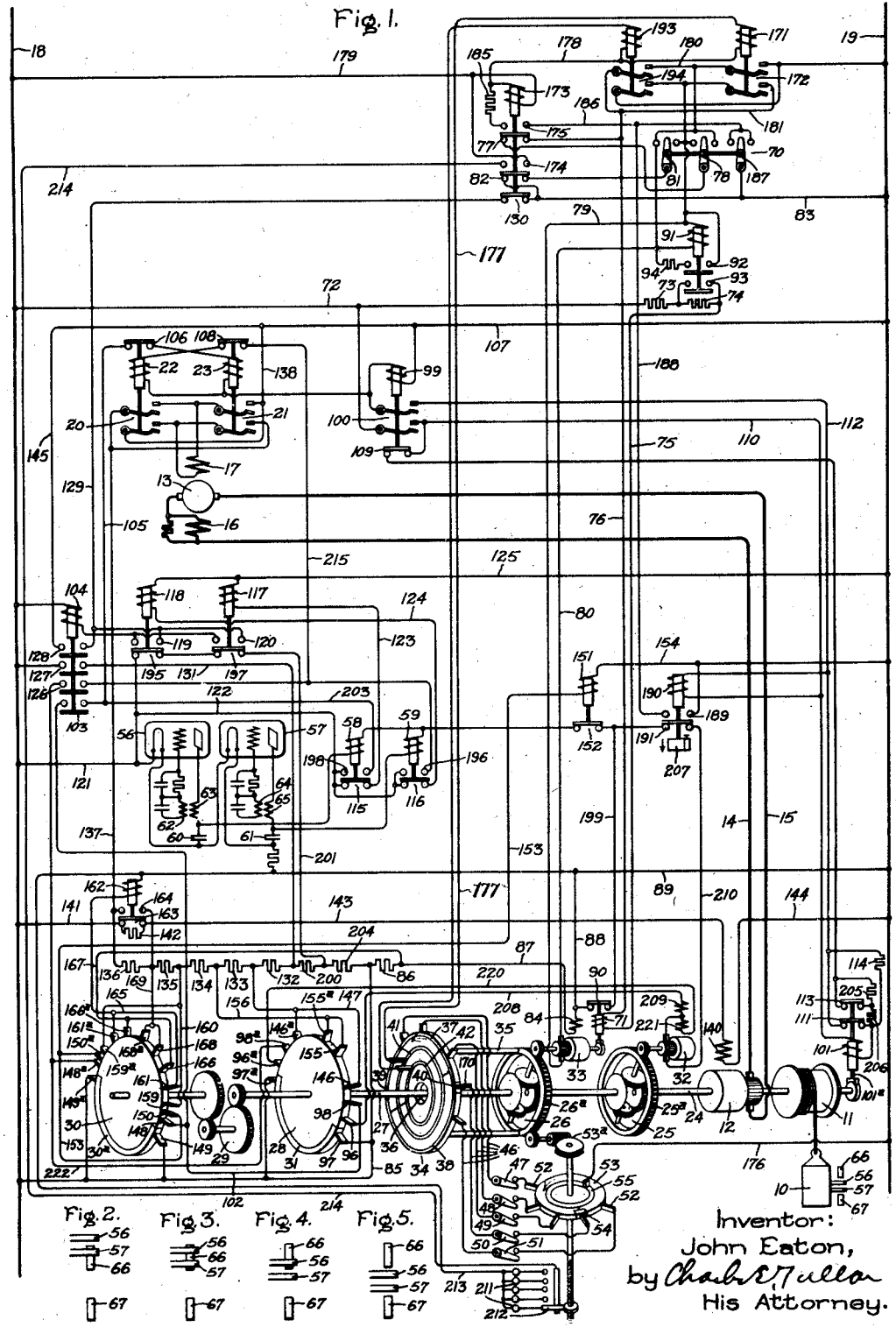

1,943,114

UNITED STATES PATENT OFFICE 1,943,114

CONTROL SYSTEM

John Eaton, Schenectady, N. Y., assignor to General Electric Company, a corporation of New York Application January 20, 1931. Serial No. 509,973

36 Claims. (Cl. 172—152)

My invention relates to control systems for elevators, and the like, more particularly to control means for electrically operated devices of that character, and has for its object the provision of a reliable system of control giving improved operating efficiency.

One of the objects of my invention is to provide control means whereby the elevator or other controlled device is accelerated and decelerated so as to maintain a predetermined relation between the speed of the elevator and its distance from the floor which it is leaving or approaching. In this manner the greatest possible efficiency of the elevator is obtained since the elevator cannot be decelerated too quickly so that it must continue on to the landing at slow speed, nor can deceleration be delayed so that the elevator overruns the landing.

In carrying out my invention in one form I provide a differentially operated control means for controlling the acceleration and deceleration of the elevator. This control means is operated jointly by a small advance driving motor and the main driving motor of the elevator. At the start the control means is operated solely by the advance motor, and the motion of the main driving motor is introduced differentially so that as the driving motor comes up to speed the control means is decreased in speed. At full speed the control means is stationary in some position determined by the load, the movement of the driving motor then exactly canceling the rotation of the advance motor. This also gives a regulating action for the speed of the elevator since the elevator speed is compared with the speed of the advance driving motor and maintained in a predetermined relation therewith automatically due to the differential driving connection with the control means.

I have also provided among other features means for automatically stopping the small advance driving motor for the controller as the floor at which a stop is to be made is approached, whereby the control means is thereafter operated in the reverse direction by the main driving motor to decelerate the elevator to a predetermined low speed after which the leveling is completed by means of electric discharge devices controlled by vanes in the hatchway.

For a more complete understanding of my invention reference should be had to the accompanying drawing in which Fig. 1 is a diagrammatic representation of a system of elevator control embodying my invention, while Figs. 2 to 5 inclusive are diagrammatic views showing details of operation.

Referring to the drawing, in the specific embodiment shown the elevator 10 is raised and lowered through the usual winding drum 11 which is driven by a main driving motor 12. This driving motor is connected in a Ward-Leonard system with a generator 13 which is driven at a substantially constant speed by means of a suitable driving motor (not shown). The motor and generator are connected together in a permanent circuit by means of the conductors 14 and 15, the circuit including a series winding 16 for the generator. The starting, stopping and direction of rotation of the motor 12 is controlled by controlling the direction and degree of energization of a separately excited winding 17 for the generator which may be connected to the direct current supply mains 18 and 19 for the desired direction of excitation by means of reversing switches 20 and 21, operated respectively by the coils 22 and 23.

Various control devices are provided for controlling the energization of the field winding 17 in order to properly accelerate the elevator, to decelerate it, and to level it at the floor. It is believed that a clear understanding of the arrangement and operation of the various parts of the system will be best understood from a complete description of the operation of the elevator as a whole and therefore the construction and arrangement of certain of the devices only will be described. In addition to driving the elevator itself, the main driving motor 12 is connected to drive certain control devices. As shown, the shaft 24 of the main driving motor is connected through a differential 25 and a differential 26 to a drive shaft 27 which operates a leveling resistance controller 28. This shaft 27 is also connected through the reducing gear train 29 to a main resistance controller 30 which is substantially identical in construction with the controller 28. The speed reducing gearing 29 between the two gives about a 20:1 ratio. It is contemplated that the main controller 30 will be turned only through a maximum of 120° for each direction of travel.

The controller 28 is disc-like in form, as indicated, and has bearing upon its periphery a number of brushes as shown ten in number. A minimum of two thirds of the periphery of the controller 28 is made of electrically insulating material so that when bearing on this portion, shown as uppermost, the brushes are insulated from all conducting parts. On the other portion, shown as lowermost, is a conducting segment 31 which, when the disc is rotated, operates to successively connect the brushes electrically together as they are engaged. The construction of the controller 30 is similar to the construction of the controller 28.

The third element 25ª of the differential 25 is driven by a small correction motor 32 while the third element 26ª of the differential 26 is driven by a small electric advance motor 33. Connected also to this third element of the differential 26 is a floor finder device 34, shown in the shape of a disc fastened to the third element 26ª by bars 35. The device 34 is provided with a central aperture 36 through which the shaft 27 extends.

The floor finder 34 is provided with two conducting strips or segments 37 and 38 which are of equal length and extend around the periphery of the disc over almost 180° sections of the disc. These strips are electrically insulated at the ends by relatively short, diametrically opposite, insulating sections 39 and 40. On one side of the discs are two concentric rings 41 and 42 which are electrically conducting and also electrically connected respectively to the conducting strips 37 and 38.

Cooperating with the periphery of the floor finder 34 are five brushes, one for each floor. These brushes are spaced apart in accordance with the height of the floors. They are electrically connected through conductors 46 and floor switches 47 to 51 to five brushes 52, which are spaced proportionally to the floor heights in the hatchway and bear on the periphery of the disc-shaped floor selector controller 53. For purposes of illustration only five switches 47 to 51 corresponding with five floors have been shown. The periphery of the floor selector controller is composed entirely of electrically insulating material except for a relatively short conducting segment 54 which is electrically connected to a central electrically conducting ring 55. A brush bears on this central conducting ring. If the floor heights were such that the floor finder makes a whole number of revolutions for each floor then only one brush would be necessary for the floor finder, in which case this brush would be connected through the switches 47 to 51 to all of the brushes on the floor selector. The position of each brush on the floor finder is determined by adjusting the brush so that it rests on the proper insulating segment 39 or 40 when the elevator is at rest at the particular floor and the main and leveling controllers 28 and 30 are in the neutral position, as indicated in the drawing. Under similar conditions each floor selector brush is set to engage the conducting segment 54.

The floor selector, which is connected to the differential element 26ª through a speed reducing gearing 53ª, is driven at a relatively slow speed and operates to give a very coarse control, while the floor finder, which is driven at a relatively high speed, operates as a vernier to give a very accurate control.

The object of the correction motor 32 is to turn the leveling controller 28 and the main controller 30 independently of the elevator when necessary so as to correct its relative position with respect to the elevator travel to take up any inaccuracy, such as might be caused by the stretching or slipping of the elevator cable, etc. It will, of course, be understood that for the most satisfactory operation of the control devices 28 and 30 they must be accurately synchronized with the elevator.

For control of the elevator to decelerate it to a very low speed and then deenergize the driving motor and apply the brakes to stop the elevator accurately at the floor, electric discharge devices are provided which are carried on the elevator and cooperate with vanes mounted in the hatchway in a predetermined relation with the floor. Briefly stated, the operation is such that after the main controller 30 and the leveling controller 28 have decelerated the elevator to a predetermined low speed, such as 100 ft. per minute, the control is automatically turned over to the electric discharge devices and when the vanes in the hatchway are reached these devices further decelerate the elevator and stop it.

This electric discharge device control means is substantially as described and claimed in a copending application of Walter O. Lum, Serial No. 295,059, filed July 24, 1928, assigned to the same assignee as this invention, and in Patent 1,910,190 to Robert B. Taylor, dated May 23, 1933. As shown, two electric discharge devices 56 and 57 of the three-element type are provided. These devices are situated on the elevator by means of suitable brackets in some such relative position as indicated, the device 56 controlling the leveling in the down direction being uppermost. Briefly stated, these electric discharge devices are provided with spaced inductively related coils in the grid and plate circuits, respectively, whereby when the elevator is traveling in the hatchway and the two coils are inductively related, the discharge devices are maintained in an oscillating condition at which time the relay coils 58 and 59 are deenergized, the radio frequency oscillating current being bypassed around the relays by means of condensers 60 and 61. As shown, the discharge device 56 is provided with inductively related spaced coils 62 and 63 in the grid and plate circuits respectively while the device 57 is provided with corresponding coils 64 and 65. When the vanes 66 and 67 mounted in the hatchway come between a pair of coils, the coils are inductively isolated and consequently the oscillating condition in the discharge device is terminated whereby a direct current flows in the output circuit of the tube and energizes the relay coils 58 and 59 as desired. It will be understood that the vanes are made of a suitable electrically conducting material, such as sheet iron or copper.

After thus describing somewhat briefly some of the important features of the system, it is believed that a comprehensive understanding of the invention, as well as its operation, will be facilitated by a description of the operation of the system as a whole. It will be assumed that the elevator is to be started in a downward direction. To start the elevator the manually operated switch 70, which is shown diagrammatically, although it will be understood that this switch may be physically similar to the usual elevator switch, is thrown in the desired direction. For the downward movement assume that the switch is thrown to the left whereby a circuit is closed for the armature of the advance motor 33 including the brake coil 71 for the motor 33 whereby the brake is released and the motor started. The circuit may be traced as follows: from the supply main 18 through the conductor 72, resistance 73, resistance 74, conductor 75, brake coil 71, conductor 76, relay switch 77, the arm 78 of switch 70, conductor 79, the armature of motor 33, conductor 80, the arm 81 of switch 70, relay switch 82 and conductor 83 to the supply main 19. The shunt field 84 of the motor 33 is energized through a circuit leading from supply main 18 through conductor 85, resistance 86, conductor 87, the field 84, conductor 88 and conductor 89 to the supply main 19.

The motor 33 now starts and drives the floor finder and also through the differential 26 the leveling resistance controller 28 and the main resistance controller 30 whereby the elevator is started. The energization of the brake coil 71, whereby the brake was released, also opens the relay switch 90 in the circuit of the correction motor 32 and the coils 58 and 59 whereby energization of the correction motor as well as the energization of the coils 58 and 59 during the operation of the advance motor 33 is prevented. A coil 91 is connected across the armature of the advance motor 33 so as to be energized in accordance with the counter E. M. F. of the motor and close the relay switches 92 and 93 after the advance motor has accelerated a predetermined amount. The switch 92 connects the resistance 94 across the armature of the advance motor so that when the circuit of the advance motor is opened later on, the motor is dynamically braked through the resistance 94 and brought quickly to a stop. The closing of the switch 93 short circuits the resistance 74 in series in the circuit of the advance motor whereby the advance motor speed is increased.

At this stage the driving motor 12 is of course stationary, as is also the correction motor 32, and therefore the controllers 28 and 30 are driven solely by the advance motor. It will be assumed that the floor finder 34 is rotated in a counter-clockwise direction, in which case the leveling controller 28 and the main controller 30 are also driven in counter-clockwise directions. The floor selector 53 will also turn in a counter-clockwise direction but at a very much slower speed than the floor finder since it is connected to be driven from the floor finder through the reducing gear 53ª. In fact the floor selector, as shown, makes less than a whole revolution for the travel of the elevator past the five floors whereas the floor finder makes, for example, one revolution for 8 ft. of travel of the elevator in the hatchway.

The leveling controller 28, since it is driven at a higher speed than the main controller 30, carries out its functions first. The conductor segment 31 first engages with the second brush 96 whereby this brush is electrically connected to the first brush 97, but no control function is carried out because of the fact that the switch 90 is open as previously noted. When the segment 31 touches the third brush 98 a circuit is established for the operating coil 23 of the "down" contactor 21 including an operating coil 99 of a brake switch 100 whereby the switch 21 is closed to connect the field 17 of the generator to the supply source and the switch 100 is closed to energize the brake coil 101 to release the brake 101ª. The circuit for the coil 23 may be traced as follows: from supply main 18 through conductor 85 to brush 97, segment 31, brush 98, conductor 102, switch 103 which at this time is held closed by the energization of its operation coil 104, conductor 105, switch 106, coil 23, winding 99, and conductor 107 to the opposite supply main 19. The closing of the switch 21 also opens an interlocking switch 108 in the circuit of the operating coil 22, and the closing of the switch 100 opens a switch 109 which latter switch performs no function at this time. The circuit for the brake coil 101 may be traced as follows: from the supply main 18 through conductor 72, one side of switch 100, conductor 110, the brake coil 101, switch 111 operated by the brake coil, conductor 112, the other side of the switch 100 and the coil 99, conductor 107 to the supply main 19. When the brake coil 101 picks up its armature to release the brake it opens the switch 111 and also switch 113, the former switch inserting a resistance 114 in circuit with the brake coil 101 so as to reduce its current consumption.

At this time it should be pointed out that the relay coils 58 and 59 are deenergized as previously explained whereby the switches 115 and 116 controlled by these relays are closed and thereby close circuits for the operating coils 117 and 118 respectively which respectively hold the switches 119 and 120 closed. The circuit for the coils 58 and 59 may be traced from supply main 18 through conductor 121, conductor 122, switches 115 and 116 respectively, conductors 123 and 124, and coils 117 and 118 through the conductor 125 to the supply main 19. Either one of the switches 119 and 120, when closed, closes the circuit for the coil 104 whereby the switch 103 is closed as well as the switches 126, 127 and 128 all operated by the coil 104. The circuit for coil 104 may be traced from supply main 18 through the coil and one or the other of switches 119 and 120 to the conductor 129, switch 130 which is now closed, and conductor 83 to supply main 19.

The circuit for the generator field 17 as now closed, may be traced as follows: from supply main 18, switch 127 through conductor 131, resistances 132 to 136 inclusive, conductor 137, one side of switch 21, field winding 17, the other side of switch 21, conductor 138 and conductor 107 to supply main 19. The field winding now has relatively low excitation in view of the resistances in series with it, and the motor 12 therefore starts off at a low speed. The separately excited field 140 of the driving motor 12 is excited through a circuit leading from supply main 18 through conductor 141, switch 163, conductor 143, field winding 140, conductor 144 to the supply main 19. It should be noted that the switch 128, which is now closed, establishes a holding circuit through the conductor 145 and conductor 107 to supply main 19 for the coil 104, this holding circuit being independent of the switch 130 through which the coil was first energized.

The main driving motor 12 now operates in a direction to lower the elevator, at the same time imparting its motion through the differential 25 to the differential 26 in such direction that its rotation is subtracted in the differential 26 from the rotation applied by the advance motor 33. This slows down the leveling controller 28 and the main controller 30. In the next step the conductor segment 31 on the leveling controller engages with the brush 146 and short circuits the resistance 132 thereby increasing the generator field excitation and therefore increasing the motor speed. The circuit for the generator field is now from the supply main 18 through the conductor 85, the leveling controller 28 to the brush 146, conductor 147, the resistances 133 to 136, and on as previously traced.

The driving motor is further accelerated by the engagement of the segment 31 with the next brush 155 thereby establishing the generator field circuit through the conductor 156 and hence short circuiting the resistance 133.

In the meantime the main controller 30 has been rotated sufficiently so that its conducting segment 30ª engages the brush 148 thereby establishing a circuit for the switch coil 23 in parallel with the circuit through the leveling controller 28. The reason for this is that the main controller 30 now takes control, the leveling controller 28 having performed its function but continuing to rotate. This circuit for the switch coil 23 leads from the supply main 18 to conductor 85, the lower brush 149 of the main controller, the conducting segment of the main controller, brush 148 to the conductor 102 and thence to the switch coil as previously traced.

In the next step the segment 30ª engages the brush 150 whereby a circuit is established for the coil 151 which opens the switch 152. The switch 152 is in the supply circuit for the coils 58 and 59 and the opening of this switch further assures that these coils cannot be energized until the main controller 30 has been reversed to disengage the brush 150. The circuit for the coil 151 leads from the conductor 85 through the main controller 30, conductor 153, coil 151 and conductor 154 to the supply main 19.

At the proper time in the accelerating sequence of the elevator the conducting segment 30ª of the main controller engages with the third brush 159 whereby the generator field resistance 134 is short circuited to further accelerate the motor. The generator field circuit is now from the conductor 85 through the main controller 30, conductor 160 and resistances 135 and 136, and on as previously described.

As the acceleration of the driving motor 12 continues, the conducting segment 30ª of the main controller 30 next engages the brush 161 thereby energizing the operating coil 162 which opens the switch 163 and at the same time closes the switch 164. The circuit for the coil 162 is from supply main 18 through conductor 85, the controller 30, brush 161, conductor 165, the coil 162, and conductor 89 to the supply main 19. The opening of the switch 163 inserts the resistance 142 in the field circuit of the driving motor 12 whereby the speed of the driving motor is still further increased. The closing of the switch 164 short circuits the resistance 136 in the generator field circuit to still further accelerate the motor. The main controller next makes contact with the brush 166 whereby a circuit is established through the conductor 167 to short circuit the resistance 86 in the field circuit of the advance motor 33 whereby the field of the advance motor is strengthened and the motor speed reduced to the normal predetermined speed with which the speed of the elevator is compared and by which the elevator speed is determined. The main controller 30 next makes contact with the brush 168 whereby a circuit is established through the conductor 169 thereby short circuiting the remaining resistance 135 in the generator field.

The elevator is now up to full speed at which speed the main driving motor exactly cancels the rotation of the advance motor 33 by means of the differential 26 and consequently the leveling controller 28 and the main controller 30 remain stationary. By operating the advance motor initially at a higher speed during the main acceleration period with the resistance 86 in its field circuit, the rate of acceleration is increased. This control of the speed of the advance motor may be varied as desired to control the rate of acceleration of the elevator. It may also happen that the elevator will get up to full speed before the main controller has been turned far enough to perform the last one or two acceleration steps. Preferably the system is arranged to operate in that manner. In any case, it will be observed that the main controller will be brought to a stop in the position it happens to be when full speed is attained. It will furthermore be observed that this main controller now operates as a regulator to maintain the predetermined speed of the elevator independently of the load by comparison with the speed of the advance motor. If the elevator speed becomes too high, the main controller is turned back to reduce the speed and vice versa.

The operation of the control means whereby the elevator is now automatically decelerated and stopped, leveled, at a particular preselected floor will now be described. Let it be assumed that a passenger on the elevator wishes to get off at a particular floor. Upon hearing the floor called, the operator in the elevator closes a control circuit corresponding to that floor by closing the corresponding switch 47 to 51 inclusive. In the particular system shown the switches 47 to 51 inclusive will be installed in the elevator. By providing more switches other than 47 to 51 any additional number of floors can be taken care of. Since the elevator is necessarily stopped at the terminal floors, that is, the top and the bottom floors, the switches 47 and 51 corresponding with these floors may remain permanently closed or replaced by permanent connections. It will be understood that these switches may, and preferably are, closed by push buttons mounted on a panel in the elevator. They may also be closed by suitable relays (not shown) controlled by push buttons at the respective landings. Suitable means, not shown, will also be provided for opening the closed switches as the stops are made. This means may be automatic, or the operator may open each switch as the stop is made. The switches of course may be closed to preregister the desired stop at any time, either before the elevator starts or after, as long as the elevator is still farther than the required deceleration and leveling distance from the desired floor.

Assume that a stop is registered for a particular floor, such as the second floor, by closing the switch 50. During the acceleration and full speed running of the elevator, the floor finder 34 and the floor selector 53 have been turning in their respective high speed and low speed driving ratios. The floor finder will make many revolutions whereas the floor selector, as shown diagrammatically, will make somewhat less than a full revolution for travel of the elevator between the five floors indicated. As the elevator proceeds downward, the conducting segment 54 on the floor selector successively engages the various brushes but as we have assumed that neither of the switches 48 or 49 were closed, the elevator runs through these floors without stopping When the elevator reaches a predetermined distance from the floor corresponding with the switch 50, which distance is somewhat greater than is necessary for deceleration and leveling, the conductor segment 54 engages with the brush corresponding with the switch 50. At this instant also the brush 170 on the floor finder is somewhere on the conducting segment 37, probably about midway of the length of the segment, and consequently a circuit is closed for the operating coil 171 which, when energized, closes the switch 172. The operating coil 173 is also included in series in this circuit and is energized to open the switches 77, 82, 130, while closing the switches 174 and 175. This control circuit may be traced as follows: from the supply main 19 through the conductor 176, the floor selector, switch 50 which is closed, brush 170, segment 37, conductor ring 41, and through its brush, conductor 177, coil 171, conductor 178, coil 173 and conductor 179 to the supply main 18.

The closing of the switch 172 closes an auxiliary circuit for the armature and brake coil of the advance motor 33 while the opening of the switches 77 and 82 takes the control of this circuit away from the manually operated switch 70. It will be observed that the upper switch member of the switch 172 closes a circuit, through conductor 180, which is in parallel with the switch arm 81 and that the lower switch member of switch 172 closes a circuit through the conductor 181 in parallel with the switch arm 78. These respective parallel switch arm circuits are opened by the switches 82 and 77 respectively and consequently the control of the advance motor is now entirely in the switch 172 which switch is in turn controlled by the floor finder 34.

The opening of switch 130 opens the branch circuit for the operating coil 104 so that this coil is now held energized only by its own holding circuit through the switch 128 and the switch 119 or the switch 120. In other words, when the coil 104 is now deenergized it cannot again be energized until the switch 130 has been closed.

The switch 175 closes two auxiliary circuits for the coil 173 in parallel with the floor finder 34 so that the energization of this coil 173 is no longer under the control of the floor finder. One circuit for the coil 173 may be traced as follows: from the supply main 18 through conductor 179, the coil 173, resistance 185, the switch 175, conductor 186, the switch arm 187 and the conductor 83 to the supply main 19. The circuit is, furthermore, maintained from the conductor 186 through the conductor 188, the switch 189, and conductor 154 to the supply main 19. The switch 189 is maintained closed by the coil 190 connected across the brake coil 101. The energization of this coil also opens a switch 191 in the circuit of the correction motor 32 which assures that the correction motor cannot be energized as long as the elevator is running, that is, as long as the brake coil 101 is energized.

By maintaining the circuit for the operating coil 173, the switch arm 187 prevents the elevator from restarting automatically after a stop in the event that the manually operated switch 70 is inadvertently left in the closed position. It will be observed that it is necessary for the coil 173 to be deenergized to effect the closing of the switches 77 and 82 before the elevator can be started by the manually operated switch 70. The arm 187 therefore, maintains coil 173 energized and holds these switches open until the switch 70 including the arm 187 is thrown to the off position.

As the elevator continues to run at full speed, the insulating segment 40 on the floor finder 34 engages the brush 170 and thereby breaks the circuit for the operating coil 171 whereby the switch 172 drops open in accordance with its bias thereby deenergizing the armature of the advance motor 33 and the brake coil 71 for the advance motor. The advance motor is now brought quickly to rest by dynamic braking through the resistance 94, and by the brake which is applied when the coil 71 is deenergized. At this time the elevator is at the proper distance from the landing for the deceleration to begin. The advance motor may and probably will overrun sufficiently to move the insulating segment 40 past the brush 170 so that the brush engages the conducting segment 38 in which case the operating coil 193 is energized to close the switch 194. This energizes the armature of the advance motor and the braking coil 71, plugging the advance motor to rest by reverse current and reversing the advance motor to drive the floor finder back, when the advance motor will be stopped with the insulating segment 40 underneath the brush 170. The resistance 73 limits the current in the advance motor when its connections are reversed for plugging. This resistance may be varied to adjust the running speed of the advance motor and hence the running speed of the elevator. The relatively high resistance 74 gives the advance motor a slow rate of initial acceleration, so that upon overrunning, the motor is stopped before reaching full speed. The tendency of the motor to overrun is thus rapidly damped out. The floor finder now remains in this position, and also the floor selector in its position, during the remaining deceleration and leveling of the elevator.

The driving motor 12 now drives the leveling controller 28 and the main controller 30 through the differential 26 in the reverse direction which carries out the reverse of the operations previously described in connection with the acceleration of the elevator, whereby the elevator is decelerated. Finally when the two controllers have been turned back sufficiently to insert the resistances 132 to 136 in the generator field circuit, the resistance 142 being shunted by the closing of the switch 163, the elevator will be decelerated to a slow speed, such as 100 feet per minute. During this deceleration it will be observed that the speed of the elevator is at all times a function of the distance of the elevator from the landing.

The elevator, now traveling at about 100 feet per minute, for example, is quite close to the landing. For example, it may be within 12 or 15 inches from the landing depending upon the adjustments of the controls. At this point the elevator reaches the leveling vanes 66 and 67 corresponding with this particular floor and the discharge devices 56 and 57 are successively activated to further decelerate the elevator and bring it to rest at the floor. The discharge device 57, which is mounted in the lowermost position on the elevator, first comes into cooperative relation with the top vane 66 and is activated by the vane as previously described whereby the coil 59 is energized and the switch 116 opened. These relative positions of the discharge devices and the vanes are indicated diagrammatically in Fig. 2. Switch 116 opens the circuit for the coil 118 whereby the switch 119 opens in accordance with its bias and the switch 195 is closed. The coil 59 also closes the switch 196. Soon after this the discharge device 56 reaches the vane and is activated, the relative positions then being indicated in Fig. 3, whereby the coil 58 is energized and opens the switch 115. The switch 115 opens the circuit for the coil 117 whereby the switch 120 is opened and the switch 197 is closed. The energization of the coil 58 also closes the switch 198.

The circuits for the coils 58 and 59 may be traced as follows: from the supply line 19 to conductor 89, conductor 88, switch 90 which was closed when the brake coil 71 was deenergized, the conductor 199, the switch 152 which was closed by the deenergization of its coil 151 when the main controller was moved back toward its neutral position, thence through the coils 58 and 59, to the plates or anodes of the respective discharge devices and then to the cathodes of the discharge devices and back through conductor 121 to the supply main 18.

The deenergization of the operating coil 104 by the opening of 119 and 120 allows the switches 103, 126, 127, and 128 to open in accordance with their bias. The opening of the switch 127, and the closing of the switches 195 and 197 in series with each other inserts the resistance 200 into the field circuit of the generator whereby the elevator speed is reduced say from 100 to 60 feet per minute. The generator field circuit is now from the supply main 18 to the conductor 121, switches 195 and 197, conductor 201, resistance 200 and the various other resistances through the generator field as previously traced.

The opening of the switch 103 takes the control for the operating coil 23 away from the leveling controller 28 and gives it over to the switch 198. It should be understood that the functions of the discharge devices described so far, take place before the conducting segment 31 on the leveling controller breaks contact with brush 98 but after the brush 146 has been disengaged and the resistance 132 thereby inserted in the generator field circuit. The circuit for the coil 23 is now through the conductor 121, the conductor 122, switch 198, conductor 203 to the conductor 105 and from thereon as previously described. In the next step the discharge device 57 moves off the upper vane to some such relative position as indicated in Fig. 4 whereby the operating coil 59 is deenergized and switch 116 closed in accordance with its bias. This switch closes the circuit for the coil 118 whereby the switch 195 is opened. The opening of switch 195 inserts the resistance 204 in the generator field, reducing the elevator speed from 60 to, for example 30 feet per minute. At the moment that the switch 195 opens the elevator is within 5 or 6 inches from the floor. The generator field circuit leads from the supply main 18 to the conductor 85 and then through the resistance 204 and the various other resistances as previously traced.

In the final step with the elevator decelerated to 30 feet per minute and about one inch away from the landing, the discharge device 56 disengages the top vane 66 so that the two discharge devices are now between the vanes as indicated in Fig. 5. This deenergizes the operating coil 58 whereby the switch 198 opens in accordance with its bias thereby opening the circuit of the coil 23 and also the circuit of the operating coil 99 in series therewith. The switch 21 thereupon drops open in accordance with its bias opening the circuit for the generator field 17, and the switch 100 also opens in accordance with its bias thereby deenergizing the brake operating coil 101. This brings the elevator to rest accurately leveled with the landing.

The brake coil 101 is short circuited through a discharge path by the closing of the switch 109 comprising the two resistances 205 and 206 and upon the application of the brake the switch 113 short circuits the resistance 205. This variation of the discharge circuit for the brake coil gives a predetermined gradual application of the brake to produce the desired rate of stopping of the elevator.

The deenergization of the brake coil 101 also deenergizes the operating coil 190, and after a predetermined time interval the switch 189 drops open thereby opening the circuit for the operating coil 173 whereby the various switches operated by the coil 173 are dropped to the positions indicated in the drawing in accordance with their bias. Also after the predetermined interval the switch 191 is dropped to its closed position in accordance with its bias thereby closing one portion of the circuit for the correction motor 32. A suitable time interval device, such as a dashpot 207, is provided to give this time delay. It is now possible for the circuit of the correction motor 32 to be closed, if necessary, in order to readjust the leveling and main controllers. For example, if the cable has stretched sufficiently so that the elevator is leveled before the conducting segment 31 on the leveling controller has disengaged the brush 96 then a circuit is established for the correction motor. This circuit may be traced from the supply main 18 through the conductor 85, the leveling controller conductor 208, one series field winding 209 of the correction motor, the armature of the correction motor, conductor 210, switch 191, conductor 199, switch 90, conductor 88, conductor 89 to the supply main 19. It will be understood that the elevator and the driving motor are now at rest, the time interval given by the device 207 being sufficient to assure this, and the advance motor 33 is also at rest, as previously noted. The correction motor 32 now starts in a direction to apply a movement through the differential 25 and differential 26 to the shaft 27 so as to move the leveling and main controllers in a counter-clockwise direction until the circuit of the correction motor is broken by the disengagement of the segment 31 with the brush 96 after which the leveling and main controllers will come to rest at substantially the positions indicated in the drawing with relation to their brushes. In view of the fact that switch 191 is opened whenever the brake coil 101 is energized the correction motor can only be started when the elevator is at rest and it will be automatically started, as previously described, when necessary, in order to introduce the desired correction.

I have also provided a series of signal lights 211 which are mounted at the floors, there being one light for each floor. These lights are controlled by a movable contact arm 212 driven by the floor selector. The circuit for the lights includes the switch 174 which is closed when the coil 173 is energized in preparation for a stop. The contact arm 212 moves over a series of contacts, one for each light, as the elevator travels in the hatchway and is in contact with the light for the selected landing when the switch 174 is closed for that landing so that the light is lighted to indicate at the floor that a stop is to be made. The circuit for the light may be traced from the supply main 19 through the conductor 89, the conductor 213, the lights, contact arm 212, conductor 214, switch 174, conductor 179 to the supply main 18.

It will be observed that in the operation of this system, the deceleration is initiated at varying distances from the floor at which the stop is to be made depending upon the speed of the elevator. This action occurs when the elevator is decelerated before it has had time to come to full speed. For example, with a high speed elevator operating at say 800 ft. per minute, the elevator does not have time with one and two-floor runs to accelerate to its full speed before it must be decelerated for the stop. In other words, the advance motor 33 does not have time to turn the leveling and main controllers 28 and 30 far enough to cut out all of the generator resistances. Since the floor selector is driven through a direct connection with the advance motor, the floor selector under these conditions will not have been driven as far ahead of the elevator as occurs with full speed and consequently the elevator will initiate its deceleration to a landing at a shorter distance from the landing than when the elevator is traveling at full speed. Under all conditions, however, the floor finder will have been moved far enough to bring the appropriate conducting segment 37 or 38 under the brush for the floor at the moment that the segment 54 in the floor selector engages the corresponding brush in the floor selector. The length of this segment 54 is proportional to the driving ratios between the floor finder and the floor selector that this is provided for. For a one-floor run, therefore, the elevator will be quite close to the landing before deceleration begins and for a two-floor run this distance is increased since the elevator is then running at a higher speed.

It will be understood that for a stop from a high speed, such as 800 feet per minute, the deceleration must begin at a point about one and one-half floors from the landing in order that the elevator may be brought to a stop in time and with sufficiently slow deceleration to avoid discomfort to the passengers. In other words, the advance motor 33 drives the floor selector in advance of the elevator by an amount dependent upon the amount of movement which is applied to the leveling and main controllers to accelerate the elevator. With normal operation of the driving motor there will be a predetermined relation between the amount of advance of the floor selector and the speed of the elevator so that the acceleration is initiated at the desired distance from the landing for the most efficient operation regardless of the length of the run. In this connection it will be understood that if the elevator is decelerated too soon it will be brought to a low speed too soon and therefore must operate at this low speed for a greater distance than is necessary whereby the efficiency of the elevator is reduced. On the other hand, if the deceleration is started too late, the elevator will run past the floor and will then have to be leveled back, with obvious delay.

In case the elevator should overrun the landing for a sufficient distance to bring the discharge device 57 into engagement with the lower vane 67, assuming the downward direction as before the discharge device 57 will be actuated whereby the operating coil 59 is energized. This closes the circuit for the operating coil 22 on the up contactor 20, the relay 108 then being closed since the down contactor 21 is open. This circuit for the coil 22 may be traced as follows: from the supply main 18 through conductor 121, conductor 122, switch 196, conductor 215, switch 108, coil 22, coil 99 and conductor 107 to the supply main 19. This closes the switches 20 and 100 to energize the field of the generator and the brake coil 101 to release the brake. The generator field is energized with all of the resistances in series, this circuit having been previously traced, except that the field is reversed through the switch 20. It is contemplated that the switch 189 will not have had time to open by reason of its time delay device 207 until after the releveling has taken place in the event of an overrun and therefore the coil 173 will still be energized so that the switch 130 is open and the coil 104 deenergized whereby the switch 127 is open. Consequently, the entire amount of resistance is included in the generator field so as to give the very low leveling speed such as 30 feet per minute to relevel the elevator. It will be understood that the adjustment will be such that an overrun of only an inch or even less will cause this releveling operation to take place. When the elevator reaches the proper position with the discharge devices off the vanes, as indicated in Fig. 5, the generator field circuit is broken and the brake applied to stop it.

In view of the fact that the operation of the control system for the up direction is similar to that for the down direction described but in the reverse sense, it is believed to be unnecessary to describe the operation of the system in detail in this direction. It will be understood that the advance motor 33 operates in the reverse direction, reversing the floor finder and the floor selector as well as the leveling and main controllers 28 and 30, the latter of which operate to perform the same accelerating function previously described in connection with the down direction.

With respect to the leveling controller 28, the brushes for the reverse or up direction have been given prime "a" reference numerals. Brush 97$^a$ is connected to the conductor 85. The brush 96$^a$ is connected through the conductor 220 to the second series field winding 221 of the correction motor 32 so that if corrections are required in the up direction, the correction motor circuit is energized through this field winding for the reverse direction of rotation. The brush 98$^a$ is connected through the conductor 222, the switch 126 and the conductor 215 and switch 108 to the operating coil 22 of the up contactor 20. The operation of this circuit will be understood from the previous description in connection with the brush 98. It will further be observed that the brush 146$^a$ is connected to the conductor 147 and therefore controls the same circuit as the brushes 146. This also applies to the brushes 155$^a$ and 155.

In like manner the brush 149$^a$ of the main controller is connected to the conductor 85 and the brush 148$^a$ is connected to the conductor 222 so that the main controller takes control of the coil 22 as will be understood from the previous description in connection with the operation in the up direction. The brushes 150$^a$, 159$^a$, 161$^a$, 166$^a$ and 168$^a$ are connected to control the same circuits as the brushes 150, 159, 161, 166 and 168.

Another advantage of the system is that any stop signal which is given too late for the elevator to make a good stop, that is, with the elevator too near the floor for proper deceleration and leveling, is bypassed automatically while all other stop signals are accepted. It will be understood that by stop signal is meant the registering of a stop by the closing of one of the switches 48, 49 and 50 which, as previously pointed out, may be push buttons either on the car itself or at the landings. This function of automatically bypassing signals which are too late is inherent in the so-called "advance" of the signal, that is, the advance of the floor finder and floor selector by means of the advance motor 33. For example, suppose that the car is running at high speed and that the stop signal with this high speed must be given at least 1½ floors away in order that an accurate stop can be made, the floor selector will be under these conditions far enough ahead of the elevator so that its insulating segment 54 will move past and disengage the brush corresponding to the floor when the elevator has passed the 1½ floor distance point. In other words, when the elevator is 1½ floors away from a floor it is approaching, the contacting segment 54 will be just about to disengage the brush for that floor and upon a continued movement of the elevator, such that a stop for that floor can no longer be made, will have disengaged the brush for that floor.

Another advantage is that the elevator is always accelerated at the normal rate, that is, on a given normal speed time curve, and also decelerated on a given normal speed time curve, regardless of the length of the run. This is important particularly in connection with short runs where the elevator is decelerated before it has a chance to get up to full speed. In such cases the elevator is accelerated normally to a certain point where deceleration begins at once, without any intermediate running period at a reduced speed corresponding with the length of the run.

On plugging operation, that is, when the car switch 70 is thrown suddenly to the reverse position as might be necessary for an emergency stop the car is automatically decelerated, reversed and accelerated in the opposite direction at about twice the normal rate. This is due to the fact that when the car switch is thus thrown to the reverse position the advance motor is reversed practically instantaneously so that it drives the leveling and main controllers in the same direction as the main driving motor during the deceleration whereas under normal conditions the advance motor is simply stopped. When the elevator comes to a stop and reverses, the advance motor continues its rotation in the same direction and has therefore driven the leveling and main controllers a considerable distance ahead of the elevator due to the fact that it has been running during the period of deceleration and consequently the acceleration steps are carried out more quickly so as to give about twice the normal acceleration rate.

The control, furthermore, provides for the independent adjustment of the acceleration and deceleration rates. It will be observed that the acceleration rate depends upon the speed of the advance motor, as previously pointed out, and the speed of the advance motor can be adjusted as desired to adjust the rate of acceleration. The rate of deceleration is a function of the distance of the elevator from the landing and therefore the resistance stops and controls can be adjusted independently to adjust the rate of deceleration. Furthermore, it will be observed that the regulation of both acceleration and deceleration is independent of the load on the elevator.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is,—

1. A control system for elevators and the like, comprising a main electric driving motor for the elevator, an electrical resistance in a control circuit for said motor, control means for said resistance, an auxiliary motor for operating said control means to vary said resistance, a floor controller for deenergizing said auxiliary motor and a driving connection between said main motor and said control means.

2. A control system for elevators and the like, comprising a main electric driving motor for the elevator, control means for said motor including an electrical resistance in a control circuit for said motor, an auxiliary motor for operating said control means to vary said resistance, a floor controller for deenergizing said auxiliary motor, a driving connection between said main motor and said control means and manually operated control means for said auxiliary motor.

3. A control system for elevators and the like, comprising an electric driving motor, control means for said motor including a resistance in a control circuit for said motor, an auxiliary motor for operating said control means to vary said resistance and thereby accelerate the elevator, a floor controller for deenergizing said auxiliary motor and a driving connection between said control means and said driving motor arranged to operate said control means to decelerate the elevator.

4. The combination with an elevator or the like, of a driving motor therefor, a control means for said motor, a differential gear, a driving connection between said control means and an output element of said differential gear, a driving connection between said driving motor and an input element of said differential gear, an auxiliary motor connected to a second input element of said differential gear, means for starting said auxiliary motor and a floor controller driven by said auxiliary motor for deenergizing said auxiliary motor.

5. The combination with an elevator or the like, of an electric driving motor therefor, a resistance in the control circuit for said motor, means for cutting out sections of said resistance to control said motor, a second resistance in the control circuit of said motor, means driven at a predetermined reduced speed with said first means for cutting out said first resistance independently of said first means and for cutting out sections of said second resistance and an auxiliary motor for driving said control means.

6. The combination with an elevator or the like, of an electric driving motor therefor, a resistance in the control circuit for said motor, means for cutting out sections of said resistance to control said motor, a second resistance in the control circuit of said motor, means driven at a predetermined reduced speed with said first means for cutting out said first resistance independently of said first means and for cutting out sections of said second resistance, an auxiliary motor for driving said control means, a switch on the elevator for starting said auxiliary motor and manually controlled means for stopping said auxiliary motor.

7. The combination with an elevator or the like, an electric driving motor for said elevator, a resistance in the control circuit for said driving motor, control means for said resistance, a differential driving connection between said motor and said control means, an auxiliary motor connected to said differential connection and means responsive to the movement of the elevator for establishing a predetermined relation between said control means and said elevator.

8. A control system for a device movable in a constrained path, comprising a main driving motor for said device, control means for said main driving motor, an auxiliary motor, differential driving connections between said motors and said control means and stop selector means driven by said auxiliary motor.

9. A control system for a device movable in a constrained path, comprising a main driving motor for said device, control means for said main driving motor, an auxiliary motor, differential driving connections between said motors and said control means, stop selector means driven by said auxiliary motor and manually operated switching means for starting said auxiliary motor whereby said auxiliary motor operates said control means to accelerate said main driving motor and advance said selector means.

10. A control system for elevators and the like, comprising a main electric driving motor for the elevator, resistances in a control circuit for said motor, a control device for said resistances driven by said motor, an auxiliary motor differentially connected to drive said control device jointly with said main driving motor, a manually operated switch for starting said auxiliary motor to start the elevator, floor selector means driven by said auxiliary motor for stopping said auxiliary motor a variable distance from the floor at which a stop is to be made, and means associated with said floor selector for preselecting the floor at which a stop is to be made.

11. A control system for elevators and the like, comprising a main electric driving motor for the elevator driven elevator, a control means for said motor driven by said motor, an auxiliary motor differentially connected to drive said control means jointly with said main driving motor, a manually operated switch for starting said auxiliary motor for stopping said auxiliary motor, whereby said control means is driven by said main driving motor to decelerate the elevator, means associated with said floor selector for preselecting the floor at which a stop is to be made and auxiliary means in the path of travel of the elevator for controlling said resistances to still further decelerate the elevator.

12. A control system for elevators and the like, comprising a main electric driving motor for the elevator, resistances in a control circuit for said motor, a plurality of control devices for said resistances driven in different speed ratios by said main driving motor, an auxiliary motor differentially connected to drive said control devices jointly with said main driving motor, a manually operated switch for starting said auxiliary motor to start said elevator, floor selector means driven by said auxiliary motor for stopping said auxiliary motor a variable distance from the floor at which a stop is to be made, means associated with said floor selector for preselecting the floor at which a stop is to be made, and auxiliary means in the path of travel of the elevator for controlling said resistances to level the car at the landing.

13. A control system for elevators and the like, comprising a main electric driving motor for the elevator, resistances in a control circuit for said motor, a plurality of control devices for said resistances driven in different speed ratios by said motor, an auxiliary motor differentially connected to drive said control devices jointly with said main driving motor, floor selector means driven by said auxiliary motor for stopping said auxiliary motor, said auxiliary motor operating to drive said floor selector means as a function of time whereby deceleration for a stop before the elevator is up to full speed is initiated a distance from the floor dependent upon the time the elevator has been in operation and means associated with said floor selector for preselecting the floor at which a stop is to be made.

14. A control system for elevators and the like, comprising a main electric driving motor for the elevator, a control device for said motor driven by said motor, an auxiliary motor differentially connected to drive said control device jointly with said main driving motor, a manually operated control switch for said auxiliary motor, a floor finder device driven by said auxiliary motor arranged to maintain the circuit for said auxiliary motor but to open said circuit when the elevator arrives at a predetermined relation with the floor at which a stop is to be made, floor selector means driven by the auxiliary motor for transferring the control of the auxiliary motor from said manually operated switch to said floor finder whereby the auxiliary motor is stopped by said floor finder when the elevator reaches said predetermined relation and means associated with said floor selector for preselecting the floor at which a stop is to be made.

15. A control system for a device movable in a constrained path, comprising a main driving motor for said device, control means for operating main driving motor, an auxiliary motor for starting said control means, means for starting said auxiliary motor to start said main driving motor and means driven by said auxiliary motor to initiate the for controlling said auxiliary motor.

16. A control system for a device movable in a constrained path, comprising a main driving motor for said device, control means for said main driving motor, an auxiliary motor for operating said control means, a manually operated switch for starting said auxiliary motor to start said main driving motor and means driven by said auxiliary motor for controlling said auxiliary motor to decelerate said main driving motor.

17. A control system for elevators and the like, comprising a main driving motor for the elevator, control means for said main driving motor, an auxiliary motor for operating said control means, a manually operated switch for starting said auxiliary motor, means driven by said auxiliary motor for controlling a circuit to take the control of said auxiliary motor away from said switch and means driven by said auxiliary motor for controlling said circuit to initiate the deceleration of said main driving motor.

18. A control system for elevators and the like, comprising a main driving motor for the elevator, control means for said driving motor, a driving connection between said driving motor and said control means, an auxiliary motor differentially connected to operate said control means jointly with said driving motor, a switch for starting said auxiliary motor to start said main driving motor and means driven by said auxiliary motor for controlling said auxiliary motor to initiate the deceleration of said main driving motor.

19. A control system for elevators and the like, comprising a main driving motor for the elevator, control means for said main driving motor, a driving connection between said driving motor and said control means, an auxiliary motor differentially connected to operate said control means jointly with said driving motor, a manually operated switch for starting said auxiliary motor to start said main driving motor, means driven by said auxiliary motor for stopping said auxiliary motor to initiate the deceleration of said main driving motor and means controlled by said switch for preventing the restarting of said auxiliary motor until said switch has first been moved to the off position.

20. A control system for elevators and the like, comprising a main driving motor for the elevator, control means for said driving motor, a driving connection between said driving motor and said control means, an auxiliary motor differentially connected to operate said control means jointly with said driving motor, a switch for starting said auxiliary motor to start said main driving motor, control means driven by said auxiliary motor for controlling said auxiliary motor to initiate the deceleration of said main driving motor and means associated with said auxiliary motor control means for preselecting the floor at which a stop is to be made.

21. A control system for elevators and the like, comprising a main driving motor for the elevator, control means for said driving motor, a driving connection between said driving motor and said control means, an auxiliary motor differentially connected to operate said control means jointly with said driving motor, a manually operated switch for starting said auxiliary motor to start said main driving motor, control means driven by said auxiliary motor for stopping said auxiliary motor to initiate the deceleration of said main driving motor, means associated with said auxiliary motor control means for preselecting the floor at which a stop is to be made, and auxiliary means in the path of travel of the elevator for operating said main driving motor control means to level the car at the landing.

22. A control system for elevators and the like, comprising a main driving motor for the elevator, control means for said driving motor, a driving connection between said driving motor and said control means, an auxiliary motor and said connected to operate said control means jointly with said driving motor, a manually operated switch for starting said auxiliary motor to start said main driving motor, means driven by said auxiliary motor for completing a circuit to take the control of said auxiliary motor away from said switch and means driven by said auxiliary motor for opening said circuit to stop said auxiliary motor and thereby decelerate said main driving motor in accordance with its own operation.

23. In a system of control for elevators and the like, a main driving motor for the elevator, control means for said main driving motor, a driving connection between said driving motor and said control means, means in the path of travel of the elevator for leveling said elevator at the floor and reset means controlled by said control means for adjusting said driving connection to establish a predetermined relation between said control means and said elevator.

24. In a system of control for elevators and the like, a main driving motor for the elevator, control means for said main driving motor, connection between said driving motor, a driving control means, means in the path of travel of the elevator for leveling said elevator at the floor and reset means controlled by said control means for adjusting said driving connection to establish a predetermined relation between said control means and said elevator, and means responsive to the operation of said elevator for rendering said reset means ineffective.

25. A control system for elevators and the like, comprising a main driving motor for the elevator, control means for said driving motor, a driving connection between said driving motor and said control means, an auxiliary motor differentially connected to operate said control means jointly with said driving motor, a switch for starting said auxiliary motor to start said main driving motor, means driven by said auxiliary motor for controlling said auxiliary motor to initiate the deceleration of said main driving motor and means controlled by said control means for adjusting said driving connection to establish a predetermined relation between said control means and said elevator.

26. A control system for elevators and the like, comprising a main driving motor for the elevator, control means for said driving motor, a driving connection between said driving motor and said control means, an auxiliary motor differentially connected to operate said control means jointly with said driving motor, a switch for starting said auxiliary motor to start said main driving motor, means driven by said auxiliary motor for controlling said auxiliary motor to initiate the deceleration of said main driving motor, means in the path of travel of the elevator for leveling said elevator at the floor and means operative when the elevator stops at a landing for adjusting said driving connection to establish a predetermined relation between said control means and said elevator.

27. A control system for elevators and the like, comprising a main driving motor for the elevator, control means for said driving motor, a driving connection between said driving motor and said control means, an auxiliary motor differentially connected to operate said control means jointly with said driving motor, a switch for starting said auxiliary motor to start said main driving motor, means driven by said auxiliary motor for controlling said auxiliary motor to initiate the deceleration of said main driving motor, a correction motor connected differentially to drive said control means jointly with said driving motor and means controlled by said control means for operating said correction motor to establish a predetermined relation between said control means and said elevator.

28. A control system for elevators and the like, comprising a main driving motor for the elevator, control means for said driving motor, a driving connection between said driving motor and said control means, an auxiliary motor differentially connected to operate said control means jointly with said driving motor, a switch for starting said auxiliary motor to start said main driving motor, means driven by said auxiliary motor for controlling said auxiliary motor to initiate the deceleration of said main driving motor, a correction motor connected differentially to drive said control means jointly with said driving motor and means controlled by said control means for operating said correction motor to establish a predetermined relation between said control means and said elevator, and means responsive to the operation of the elevator for preventing operation of said correction motor.

29. A control system for elevators and the like, comprising a main electric driving motor for the elevator, control means for said driving motor, a driving connection between said driving motor and said control means, an auxiliary motor differentially connected to operate said control means jointly with said driving motor, a manually operated switch for starting said auxiliary motor to start said main driving motor, floor selector means driven by said auxiliary motor for completing a circuit to take the control of said auxiliary motor away from said switch, means driven by said auxiliary motor for opening said circuit to stop said auxiliary motor and thereby decelerate said main driving motor in accordance with its own operation and means associated with said floor selector means for preselecting the floor at which a stop is to be made.

30. A control system for elevators and the like, comprising a main driving motor for the elevator, switches and resistances for controlling said main driving motor, means for controlling said switches and said resistances, a driving connection between said control means and said main driving motor including a pair of differential devices, an advance motor connected to an element of one of said differential devices so as to drive said control means jointly with said main driving motor, a correction motor connected to an element of the other of said differential devices so as to drive said control means jointly with said main driving motor, means controlled by said control means for operating said correction motor to establish a predetermined relation between said control means and said elevator, a manually operated switch for starting said advance motor to start said main driving motor and means driven by said advance motor for stopping said advance motor to decelerate said main driving motor in accordance with its own operation.

31. A control system for elevators and the like, comprising a main electric driving motor for the elevator, a plurality of resistances for controlling said motor, a selective device for short circuiting one of said resistances during acceleration and normal running operation of said motor, means for controlling the remainder of said resistances to accelerate and decelerate said motor, and auxiliary means in the path of travel of the elevator for controlling said selective device to open said short circuit to still further reduce the speed of the elevator to a leveling speed.

32. A control system for elevators and the like, comprising a main electric driving motor for the elevator, control means for said motor, an auxiliary electric motor for operating said control means, switching means for starting said auxiliary motor to start the elevator, floor selective switching means responsive to the operation of said auxiliary motor for deenergizing said auxiliary motor, and a driving connection between said main motor and said control means.

33. A control system for elevators and the like, comprising a main electric driving motor for the elevator, electromagnetically operated reversing switches for controlling the starting and stopping of said motor, speed control means for said motor, a control device for said switches and said speed control means, an auxiliary electric motor, a differential driving connection between said control device and said motors, switching means for starting said auxiliary motor to initiate the starting of the elevator in the desired direction and for stopping said auxiliary motor to effect the deceleration of the elevator.

34. A control system for elevators and the like, comprising a main electric driving motor for the elevator, electromagnetically operated reversing switches for controlling the starting and stopping of said motor, speed control means for said motor, a control device for said switches and said speed control means, an auxiliary electric motor, a differential driving connection between said control device and said motors, switching means for starting said auxiliary motor to initiate the starting of the elevator in the desired direction, and floor selective means responsive to the operation of said auxiliary motor for deenergizing said auxiliary motor.

35. A control system for elevators and the like, comprising a main driving motor for the elevator, an auxiliary motor, control means for said auxiliary motor movable to a predetermined position to open the circuit of said auxiliary motor, a differential gear, driving connections between the input elements of said differential gear and said motors, a connection between the output element of said differential gear and said control means, and switching means connected in circuit with said control means and said auxiliary motor for closing the circuit of said auxiliary motor for operation to move said controller to said predetermined position.

36. A control system for elevators and the like, comprising a main driving motor for the elevator, an auxiliary motor, control means for said auxiliary motor movable to a predetermined position to open the circuit of said auxiliary motor, a differential gear, connections between the input elements of said differential gear and said motors, a connection between the output element of said differential gear and said control means, switching means in circuit with said control means and said auxiliary motor for closing the circuit of said auxiliary motor in the event that said control means is in a position to complete the circuit of said auxiliary motor, and means responsive to the stopping of said elevator for closing said switching means whereby said auxiliary motor is operated to turn said controller to said predetermined position.

JOHN EATON.